(12) United States Patent
Du et al.

(10) Patent No.: US 10,516,862 B2
(45) Date of Patent: Dec. 24, 2019

(54) DISPLAY SYSTEM OF ROBOT

(71) Applicant: YUTOU TECHNOLOGY (HANGZHOU) CO., LTD., Zhejiang (CN)

(72) Inventors: Gangying Du, Zhejiang (CN); Da Wei, Zhejiang (CN); Chengkan Lv, Zhejiang (CN); Yi Chen, Zhejiang (CN); Jian Xu, Zhejiang (CN)

(73) Assignee: YUTOU TECHNOLOGY (HANGZHOU) CO., LTD., Zhejiang (CN)

( * ) Notice: Subject to any disclaimer, the term of this patent is extended or adjusted under 35 U.S.C. 154(b) by 0 days.

(21) Appl. No.: 16/079,953

(22) PCT Filed: Feb. 20, 2017

(86) PCT No.: PCT/CN2017/074066
§ 371 (c)(1),
(2) Date: Aug. 24, 2018

(87) PCT Pub. No.: WO2017/166946
PCT Pub. Date: Oct. 5, 2017

(65) Prior Publication Data
US 2019/0068935 A1  Feb. 28, 2019

(30) Foreign Application Priority Data
Mar. 30, 2016  (CN) .......................... 2016 1 0192627

(51) Int. Cl.
*H04N 9/31*  (2006.01)
*G03B 21/10*  (2006.01)
*G03B 21/14*  (2006.01)

(52) U.S. Cl.
CPC ........... *H04N 9/3141* (2013.01); *G03B 21/10* (2013.01); *G03B 21/145* (2013.01)

(58) Field of Classification Search
CPC ........ G03B 21/00; G03B 21/10; G03B 21/14; G03B 21/145; H04N 9/31; H04N 9/3141; H04N 9/3179
See application file for complete search history.

(56) References Cited

U.S. PATENT DOCUMENTS

| | | | | |
|---|---|---|---|---|
| 5,796,443 A | * | 8/1998 | Kawajiri | H04N 9/3141 348/789 |
| 2010/0134864 A1 | * | 6/2010 | Hakii | C09D 129/14 359/270 |

(Continued)

FOREIGN PATENT DOCUMENTS

| | | |
|---|---|---|
| CN | 1437397 A | 8/2003 |
| CN | 101662626 A | 3/2010 |

(Continued)

*Primary Examiner* — Sultan Chowdhury
(74) *Attorney, Agent, or Firm* — Umberg Zipser LLP

(57) ABSTRACT

The invention discloses a display system of a robot. The robot's housing comprises: a main body having an annular curved surface; a top portion, located above and integral with the main body, and having a curved surface protruding upwards; and a base located below and connected to the main body. A display system located inside the housing comprises a receiving unit configured to receive a video signal; a screen embedded at the housing's surface; a projection unit, located opposite to the screen, and configured to project an image onto a back side of the screen; and a cover disposed between the projection unit and the screen and having a conical shape, wherein a narrow end of the cover is connected to the projection unit, a wide end of the cover is connected to the screen, and the wide end's exterior shape matches the screen's peripheral size.

9 Claims, 4 Drawing Sheets

(56) References Cited

U.S. PATENT DOCUMENTS

| | | | | |
|---|---|---|---|---|
| 2013/0335716 A1* | 12/2013 | Shields | ................... | B44F 1/10 |
| | | | | 353/99 |
| 2015/0336276 A1* | 11/2015 | Song | .................... | B25J 11/001 |
| | | | | 700/253 |
| 2016/0065920 A1* | 3/2016 | Flessas | ............... | H04N 9/3147 |
| | | | | 348/383 |
| 2016/0231645 A1* | 8/2016 | Mahoor | ................ | G03B 21/10 |
| 2017/0315391 A1* | 11/2017 | Zhou | .................... | G03B 21/00 |

FOREIGN PATENT DOCUMENTS

| | | |
|---|---|---|
| CN | 204976641 U | 1/2016 |
| CN | 105364930 A | 3/2016 |
| WO | 2014104531 A1 | 7/2014 |
| WO | 2017166946 A1 | 10/2017 |

* cited by examiner

DISPLAY SYSTEM OF ROBOT

CROSS-REFERENCE TO RELATED APPLICATIONS

The present application claims priority to and the benefit of Chinese Patent Application No. CN 201610192627.0 filed on Mar. 30, 2016, the entire content of which is incorporated herein by reference.

BACKGROUND OF THE INVENTION

1. Field of the Invention

The present invention relates to the technical field of display, especially to a display system applicable to a robot.

2. Description of the Related Art

In the prior art, projecting techniques are mainly used to project light after image signal processing, which can display high-definition images. However, it is necessary to use a heat abstractor to cool a projecting apparatus during projecting, thus, dust would be accumulated if it is used for a long time, and graphic effects formed by projecting would be affected, so as to deteriorate user experience.

SUMMARY OF THE INVENTION

Aiming at the technical problems on robot screens in the prior art, the invention provides a display system applicable to a robot herein intended to achieve a big screen and clear images.

The technical solutions specifically comprise:
A display system, applicable to a robot, wherein
a housing of the robot comprises:
a main body, which has an annular curved surface;
a top section, located above the main body; the roof part being connected with the main body, and having a curved surface with upward projection, wherein the main body and the top section form an integrative structure;
a base, located below the main body, and connected with the main body;
wherein the display system is within the housing of the robot, and the display system comprises:
a receiving unit, configured to receive a video signal;
a screen, embedded in a surface of the housing of the robot;
a structure locating plate;
a projection unit, provided on the structure locating plate, located at one side with respect to the screen; the projection unit being connected with the receiving unit, for projecting lights of image of the video signal to back surface of the screen;
a cover, arranged between the projection unit and the screen, and having a funnel shape, wherein a head end of the funnel-shaped cover is connected to the projection unit and a back end connected to the screen; an outer contour of the back end of the funnel-shaped cover matches with peripheral dimension of the screen;
wherein, the incident lights of image are incident into one side of the screen and transmitted through the screen, to form parallel lights to be emitted from the other side of the screen.

Preferably, an inner surface of the cover is sprayed with delustering agents, or the inner surface of the cover is configured with a delustering layer.

Preferably, the screen is embedded in the surface of the main body.

Preferably, the screen is embedded in the surfaces of the main body and the top section.

Preferably, a distance from a bottom of the screen to a bottom of the main body is between 25 mm and 30 mm.

Preferably, the screen is black, and it is made from light-transmitting materials.

Preferably, the screen is made from polymethyl methacrylate or glass.

Preferably, a height of the screen is between 120 mm and 150 mm, and a width of the screen is between 110 mm and 125 mm.

Preferably, the screen is made from glass.

Preferably, the projection unit is a digital light procession equipment.

Preferably, the incident lights of image are incident into a concave surface side of the screen, and transmitted through the screen, to form the parallel lights, then the parallel lights are emitted from a convex surface side of the screen.

The advantageous effects of the technical solutions includes: the display system utilizes a projection unit to project lights of image of the video signal to the screen of specific size in the housing of the robot, for displaying clear images; the display system utilizes a cover to prevent dust from entering the space between the screen and the projection unit, avoiding affecting graphic effects and improving visual experience of a user.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTIONS

Figure 1:
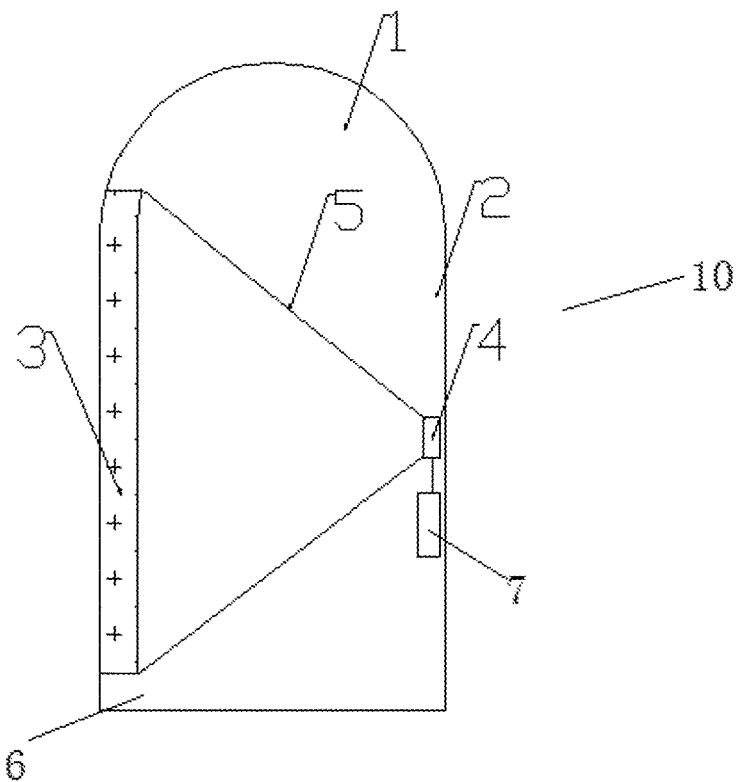
FIG. 1 is a structure diagram of a display system applicable to a robot according to a preferred embodiment of the invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

As shown in FIGS. 1-7, a display system, applicable to a robot 10, wherein a housing of the robot 10 comprises:

a main body 2, which has an annular curved surface;

a top section 1, located above the main body 2; the top section 1 being connected with the main body 2, and having a curved surface with upward projection, wherein the main body 2 and the top section 1 form an integrative structure;

a base 6, located below the main body 2, and connected with the main body 2;

wherein the display system is within the housing of the robot 10, and the display system comprises:

a receiving unit 7, configured to receive a video signal;

a screen 3, embedded in a surface of the housing of the robot 10;

a structure locating plate;

a projection unit 4, provided on the structure locating plate, located at one side with respect to the screen; the projection unit 4 being connected with the receiving unit 7, for projecting lights of image of the video signal to back surface of the screen 3;

a cover 5, arranged between the projection unit 4 and the screen 3, and the cover 5 has a funnel shape, wherein a head end of the funnel-shaped cover is connected to the projection unit 4 and a back end connected to the screen 3; an outer contour of the back end of the funnel-shaped cover matches with peripheral dimension of the screen 3;

wherein, the incident lights of image are incident into one side of the screen 3, and transmitted through the screen 3, to form a parallel light, and the parallel light is emitted from the other side of the screen 3.

Further, the top section 1 could be a hemisphere, and the main body 2 could be a side surface of a cylinder, with the top section 1 matching periphery of the main body 2; height of the screen 3 may be between 120 mm and 150 mm, and width of which may be between 110 mm and 125 mm. The transmittance of the screen 3 may be between 40%-70%.

In this embodiment, the display system utilizes the projection unit 4 to project lights of image of the video signal to the screen of specific size in the housing of the robot, for displaying clear an image; the display system utilizes the cover 5 to prevent dust from entering the space between the screen 3 and the projection unit 4, avoiding affecting graphic effects and improving visual experience of a user.

In a preferred embodiment, an inner surface of the cover 5 is sprayed with delustering agents, or the inner surface of the cover 5 is configured with a delustering layer.

In this embodiment, the delustering agents are epoxy polyacrylate resins, which can prevent light from spilling out of the covers.

Figure 5:
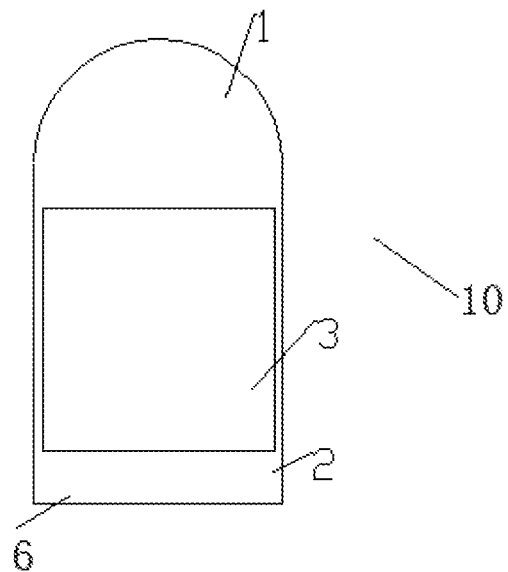
FIG. 5 is a front view of a housing of a robot according to another preferred embodiment of the invention.
Figure 6:
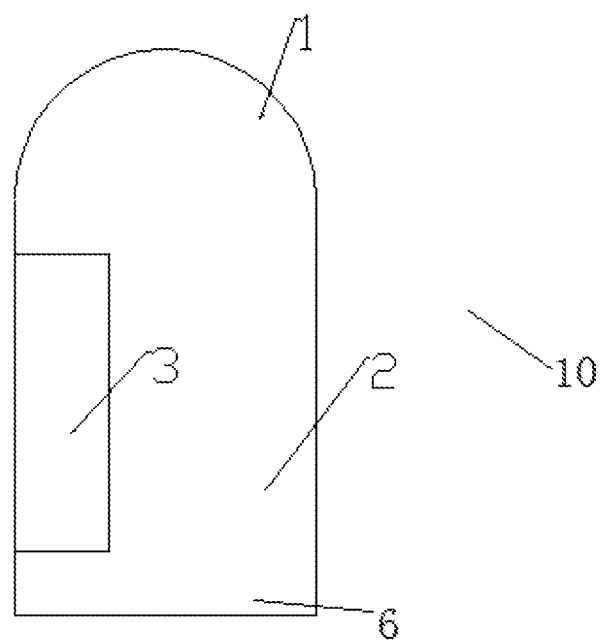
FIG. 6 is a side view of FIG. 5.
Figure 7:
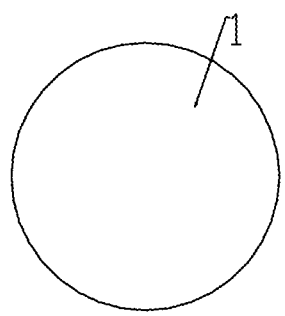
FIG. 7 is a top view of FIG. 5.

As shown in FIGS. 5-7, in a preferred embodiment, the screen 3 is embedded in the surface of the main body 2.

Furthermore, width of the screen 3 is 125 mm, height of the screen 3 is 120 mm, a distance between a bottom of the screen 3 and a bottom of the main body 2 is 30 mm; wherein the screen 3 is relatively wide, convenient for displaying images.

Figure 2:
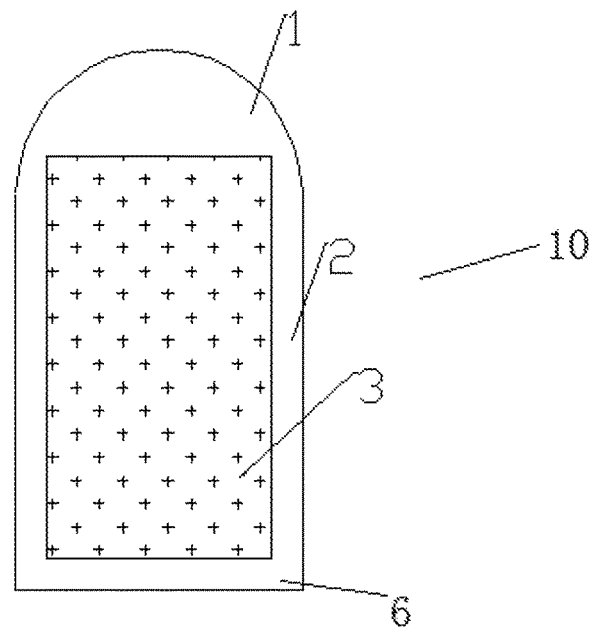
FIG. 2 is a front view of a housing of a robot according to a preferred embodiment of the invention.
Figure 3:
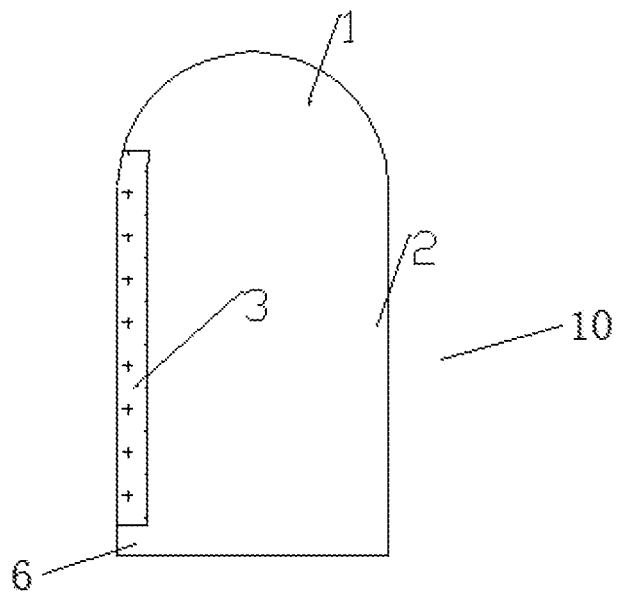
FIG. 3 is a side view of FIG. 2.
Figure 4:
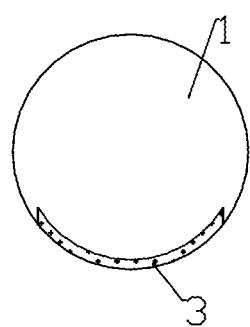
FIG. 4 is a top view of FIG. 2.

As shown in FIGS. 2-4, in a preferred embodiment, the screen 3 is embedded in the surfaces of the main body 2 and the top section 1.

Further, width of the screen 3 is 110 mm, height of the screen 3 is 150 mm, and the distance from the bottom of the screen 3 to the bottom of the main body 2 is 20 mm; wherein the screen 3 is relatively long, convenient for displaying texts.

In a preferred embodiment, the distance from the bottom of the screen 3 to the bottom of the main body 2 is between 25 mm and 30 mm.

In this embodiment, the distance from the bottom of the screen 3 to the bottom of the main body 2 may be adjusted according to displayed contents or user requirement.

In a preferred embodiment, the screen 3 is black, and it is made from light-transmitting materials.

In this embodiment, the use of the black screen 3 could highlight images in order to increase image resolution.

In a preferred embodiment, the screen 3 is made from polymethyl methacrylate. Polymethyl methacrylate has advantages of light weight, low density and high mechanical strength.

In a preferred embodiment, the screen 3 is made from glass. Glass has an advantage of showing images with high resolution.

In a preferred embodiment, the projection unit 4 is a digital light procession (DLP) equipment, images projected by the digital light procession equipment could possess resolution of 640×480px, and brightness of more than 50 Lux.

Furthermore, the projection unit 4 is a pica-projector, which has advantages of small size and high resolution.

In this embodiment, DLP technology is used to project the lights of image of the video signal after digital processing, Which may display fine contents, and display clear projecting contents during projecting; and it may keep projection brightness relatively high, and as the DLP equipment has long service life, the brightness of the display screen will not vary as time goes on, consequently, user experience will be improved.

In a preferred embodiment, the incident lights of image are incident into a concave surface side of the screen 3, and transmitted through the screen 3, to form parallel lights, then the parallel lights are emitted from a convex surface side of the screen 3.

These embodiments shown above represent only preferred examples of the present invention and may therefore not be understood to be limiting of the embodiments and scope of the invention. Alternative embodiments that can be contemplated by the person skilled in the art are likewise included in the scope of the present invention.

What is claimed is:

1. A display system of robot, applicable to a robot, wherein
a housing of the robot comprises:
a main body, which is a side surface of a cylinder, the main body has an annular curved surface;
a top section, located above the main body; and connected with the main body, the top section having a curved surface protruded upward, wherein the main body and the top section being an integrated structure;
a base, located below the main body, and connected with the main body;
wherein the display system is within the housing of the robot, and the display system comprises:
a receiving unit, configured to receive a video signal;
a screen, embedded in a surface of the housing of the robot;
a structure locating plate;
a projection unit, provided on the structure locating plate, located at one side opposite to the screen; the projection unit being connected with the receiving unit, for projecting a lights of image of the video signal to back surface of the screen;
a cover, arranged between the projection unit and the screen, and having a funnel shape, wherein a head end of the funnel-shaped cover is connected to the projection unit and a back end of the funnel-shaped cover is connected to the screen; an outer contour of the back end of the funnel-shaped cover matches with peripheral dimension of the screen;
wherein, the incident lights of image are incident into one side of the screen, and transmitted through the screen, to emit out parallel lights from the other side of the screen;
transmittance of the screen is between 40%-70%, and
the incident lights of image are incident into a concave surface side of the screen, and transmitted through the screen, to emit out the parallel lights from a convex surface side of the screen.

2. The display system as claimed in claim 1, wherein an inner surface of the cover is sprayed with delustering agents, or the inner surface of the cover is arranged with a delustering layer.

3. The display system as claimed in claim 1, wherein the screen is embedded in the surface of the main body.

4. The display system as claimed in claim 1, wherein the screen is embedded in the surfaces of the main body and the top section.

5. The display system as claimed in claim 1, wherein a distance between a bottom of the screen and a bottom of the main body is in the range of 25 mm and 30 mm.

6. The display system as claimed in claim 1, wherein the screen is black, and is made from light-transmitting materials.

7. The display system as claimed in claim 1, wherein the screen is made from polymethyl methacrylate or glass.

8. The display system as claimed in claim 1, wherein a height of the screen is between 120 mm and 150 mm, and a width of the screen is between 110 mm and 125 mm.

9. The display system as claimed in claim 1, wherein the projection unit is a digital light processing equipment.

* * * * *